United States Patent
Shen et al.

(10) Patent No.: US 12,458,930 B2
(45) Date of Patent: Nov. 4, 2025

(54) SCALING-RESISTANT AND YELLOWING-RESISTANT REVERSE OSMOSIS COMPOSITE MEMBRANE AND PREPARATION METHOD THEREOF

(71) Applicant: Jiangsu Longmem Environmental Technology Co., Ltd., Changzhou (CN)

(72) Inventors: Juan Shen, Changzhou (CN); Yuchen Zhao, Changzhou (CN); Wei Wang, Changzhou (CN); Peng Zhang, Changzhou (CN); Xiaodong Nan, Changzhou (CN)

(73) Assignee: Jiangsu Longmem Environmental Technology Co., Ltd., Changzhou (CN)

( * ) Notice: Subject to any disclaimer, the term of this patent is extended or adjusted under 35 U.S.C. 154(b) by 124 days.

(21) Appl. No.: 17/771,022

(22) PCT Filed: Dec. 28, 2021

(86) PCT No.: PCT/CN2021/141911
§ 371 (c)(1),
(2) Date: May 27, 2022

(87) PCT Pub. No.: WO2022/105937
PCT Pub. Date: May 27, 2022

(65) Prior Publication Data
US 2024/0139687 A1  May 2, 2024

(30) Foreign Application Priority Data

May 17, 2021 (CN) .......................... 202110533257.3

(51) Int. Cl.
| | | |
|---|---|---|
| B01D 69/02 | (2006.01) | |
| B01D 67/00 | (2006.01) | |
| B01D 69/12 | (2006.01) | |
| B01D 71/56 | (2006.01) | |

(52) U.S. Cl.
CPC ......... B01D 69/02 (2013.01); B01D 67/0006 (2013.01); B01D 69/1214 (2022.08); B01D 69/125 (2013.01); B01D 71/56 (2013.01); *B01D 2323/081* (2022.08); *B01D 2323/12* (2013.01); *B01D 2323/21839* (2022.08); *B01D 2323/219* (2022.08); *B01D 2323/38* (2013.01); *B01D 2325/28* (2013.01); *B01D 2325/36* (2013.01)

(58) Field of Classification Search
CPC .. B01D 69/02; B01D 69/1214; B01D 69/125; B01D 69/1251; B01D 69/1411; B01D 69/12; B01D 67/0006; B01D 67/00931; B01D 67/0083; B01D 67/0088; B01D 67/00; B01D 71/56; B01D 71/401; B01D 71/68; B01D 71/281; B01D 2323/219; B01D 2323/081; B01D 2323/21839; B01D 2323/12; B01D 2323/38; B01D 2325/28; B01D 2325/36; B01D 2325/30; B01D 61/025; Y02A 20/131
USPC .................................................... 210/500.27
See application file for complete search history.

(56) References Cited

U.S. PATENT DOCUMENTS

| | | | | |
|---|---|---|---|---|
| 2013/0228511 A1* | 9/2013 | Chang | .................. | B01D 71/281 525/299 |
| 2014/0083931 A1* | 3/2014 | Chang | .................. | B01D 71/281 210/500.34 |

FOREIGN PATENT DOCUMENTS

| | | | | |
|---|---|---|---|---|
| CN | 102380257 A | | 3/2012 | |
| CN | 113244780 A | * | 8/2021 | ............. B01D 67/00 |
| CN | 113244781 A | | 8/2021 | |
| WO | 2012128939 A2 | | 9/2012 | |

OTHER PUBLICATIONS

CN 113244780 A English description, Aug. 13, 2021, Shen Juan et al.*

* cited by examiner

*Primary Examiner* — Akash K Varma
(74) *Attorney, Agent, or Firm* — Hemisphere Law, PLLC; Zhigang Ma

(57) ABSTRACT

The present disclosure relates to a scaling-resistant and yellowing-resistant composite reverse osmosis membrane and a preparation method thereof. By modifying the stability and yellowing of a coating of the reverse osmosis membrane, and grafting 2-(methacryloyloxy)ethyl)dimethyl-3-sulphoproyl) ammonium hydroxide (MEDSAH) and ethylene glycol methacrylate (EGMA) as amphoteric monomers and N-(isobutoxymethyl)acrylamide (IBMA) as yellowing-resistant particles on a surface of the reverse osmosis membrane using active polymerization, the present disclosure forms a three-network high-performance PMEDSAH/PEGMA/PIBMA composite coating. By active regulation of a polyamide (PA) layer through the three systems, the reverse osmosis membrane has high compatibility due to PMEDSAH, and stability, high hydrophilicity and anti-protein fouling property due to PEGMA, as well as yellowing-resistant property by coating PIBMA on the surface. The test results show that the reverse osmosis membrane prepared by the present disclosure has excellent stability and yellowing-resistant property. And the flux and salt rejection are also higher than those of the existing reverse osmosis membranes.

8 Claims, No Drawings

SCALING-RESISTANT AND YELLOWING-RESISTANT REVERSE OSMOSIS COMPOSITE MEMBRANE AND PREPARATION METHOD THEREOF

TECHNICAL FIELD

The present disclosure relates to the technical field of separation membranes, and specifically relates to a scaling-resistant and yellowing-resistant composite reverse osmosis membrane and a preparation method thereof.

BACKGROUND ART

The growth of industry and population has made the shortage of water resources more and more serious, promoting the innovation of water purification technology. As the most energy-efficient water treatment technology, reverse osmosis can purify seawater and wastewater into fresh water to be used by millions of people living in water-deficient areas.

For nearly 30 years, polyamide (PA) membranes have dominated the reverse osmosis membrane market. Membrane fouling is the main problem of the reverse osmosis membranes used in household, industry and seawater desalination system. During the preparation and use of the reverse osmosis membrane, the water flux and anti-fouling ability are decreased due to the scaling and yellowing of the membrane surface. Thus, the service life of the reverse osmosis membrane is shortened, which seriously affects the use of the reverse osmosis membrane.

The Chinese patent with the publication number of CN201380000815.3 applies for coating an amphiphilic ionic compound on a surface of a reverse osmosis membrane, to improve the anti-fouling performance of the reverse osmosis membrane. Although the addition of amphiphilic ions improves the flux and anti-fouling performance of the reverse osmosis membrane, the stability and long-term scaling and yellowing of the coating are also to be addressed.

SUMMARY

To solve the stability and yellowing of the post-treatment coating of the reverse osmosis membrane, the present disclosure grafts 2-(methacryloyloxy)ethyl)dimethyl-3-sulphoproyl) ammonium hydroxide (MEDSAH) and ethylene glycol methacrylate (EGMA) as amphoteric monomers and N-(isobutoxymethyl)acrylamide (IBMA) as yellowing-resistant particles on a surface of the reverse osmosis membrane using active polymerization, to form a three-network high-performance PMEDSAH/PEGMA/PIBMA composite coating. By active regulation of a polyamide (PA) layer through the three systems, the reverse osmosis membrane has high compatibility due to PMEDSAH, and stability, high hydrophilicity and anti-protein fouling property due to PEGMA, as well as yellowing-resistant property by coating PIBMA on the surface.

A preparation method of a scaling-resistant and yellowing-resistant composite reverse osmosis membrane comprises the following step:

(1) dissolving EGMA in anisole, and ultrasonically stirring to mix evenly; then sequentially adding an initiator and 2-dodecylsulfanylthiocarbonylsulfanyl-2-methyl propionic acid (DMP) as a chain transfer agent, sealing and vacuum mixing at 25° C. for 5 h to obtain a product; precipitating the product into a large amount of petroleum ether, separating by filtration, and then vacuum drying at 40° C. for 24 h to obtain poly (ethylene glycol) methacrylate (PEGMA) particles; wherein, a mass ratio of EGMA, the initiator and DMP as the chain transfer agent is: (1-3):(0.005-0.008):(0.002-0.004); and the initiator is a mixture of azobisisobutyronitrile (AIBN) and benzoyl peroxide (BPO) at a mass ratio of 1:1;

(2) immersing a commercial polysulfone supported membrane in pure water in advance for cleaning, and removing excess water via a rubber roller, then putting in an aqueous phase solution for 15 s-60 s and in an oil phase solution for 15 s-60 s, and performing heat treatment to obtain a primary composite reverse osmosis membrane; wherein, the aqueous phase solution is composed of the following components in mass percentage: the PEGMA particles 0-1%, a monomer 2.5%, and triethylamine 0.2%; the monomer in the aqueous phase solution is one of p-phenylenediamine, m-phenylenediamine and o-phenylenediamine; the oil phase solution is composed of the following components in mass percentage: 0.08% trimesoyl chloride, and a balance of a n-hexane solution; the heat treatment is carried out at 80° C. for 10 min;

(3) adding MEDSAH and IBMA to tetrahydrofuran to mix evenly, and then adding AIBN as the initiator to obtain a solution; putting the primary composite reverse osmosis membrane prepared in the step (2) in the solution for ultrasonic reaction at 25° C. for 24 h, to obtain the scaling-resistant and yellowing-resistant composite reverse osmosis membrane.

A mass ratio of MEDSAH, IBMA and AIBN as the initiator is: (1-4):(1-3):(0.003-0.005).

The technical solutions adopted by the present disclosure have the following beneficial effects:

The stability and yellowing problems of the post-treatment coating of the conventional reverse osmosis membrane are solved by the scaling-resistant and yellowing-resistant composite reverse osmosis membrane prepared by the present disclosure. A three-network high-performance PMEDSAH/PEGMA/PIBMA composite coating is formed. By the active regulation of the polyamide (PA) layer through the three systems, the reverse osmosis membrane has high compatibility due to PMEDSAH, and stability, high hydrophilicity and anti-protein fouling property due to PEGMA, as well as yellowing-resistant property by coating PIBMA on the surface.

DETAILED DESCRIPTION OF THE EMBODIMENTS

Specific examples of the scaling-resistant and yellowing-resistant composite reverse osmosis membrane of the present disclosure are provided below.

Example 1

EGMA is added to anisole, ultrasonically stirring to mix evenly. Then, AIBN as the initiator and BPO at the mass ratio of 1:1 and DMP are sequentially added, sealing and vacuum mixing at 25° C. for 5 h to obtain the product. The product is precipitated into a large amount of petroleum ether, separating via filtration, and vacuum drying at 40° C. for 24 h to obtain the PEGMA particles. The mass ratio of EGMA, the initiator and DMP is 1:0.005:0.002.

The commercial polysulfone supported membrane is immersed in pure water in advance for cleaning, and the excess water is removed via the rubber roller. Then, the commercial polysulfone supported membrane is put in the aqueous phase solution composed of 0.5% PEGMA, 2.5% m-phenylenediamine and 0.15% triethylamine for 15 s, and then put in the oil phase solution composed of the n-hexane solution containing 0.08% trimesoyl chloride for 30 s. Then, the heat treatment is carried out at 80° C. for 10 min to obtain the primary composite reverse osmosis membrane.

MEDSAH and IBMA are added into tetrahydrofuran to mix evenly, then AIBN as the initiator is added to obtain the solution. The mass ratio of MEDSAH, IBMA and AIBN is 1:2:0.003. The primary composite reverse osmosis membrane is put in the solution for ultrasonic reaction at 25° C. for 24 h, to obtain the scaling-resistant and yellowing-resistant composite reverse osmosis membrane.

Example 2

The implementation is the same as that in Example 1 except that the mass ratio of EGMA, the initiator and DMP is 3:0.008:0.004 in the synthesis of the PEGMA particles, to obtain the scaling-resistant and yellowing-resistant composite reverse osmosis membrane.

Example 3

The implementation is the same as that in Example 1 except that the mass ratio of EGMA, the initiator and DMP is 2:0.006:0.003 in the synthesis of the PEGMA particles, to obtain the scaling-resistant and yellowing-resistant composite reverse osmosis membrane.

Example 4

The preparation process of the PEGMA particles and the primary composite reverse osmosis membrane is the same as that in Example 1.

MEDSAH and IBMA are added into tetrahydrofuran to mix evenly, then AIBN as the initiator is added to obtain the solution. The mass ratio of MEDSAH, IBMA and AIBN is 3:2:0.004. The primary composite reverse osmosis membrane is put in the solution for ultrasonic reaction at 25° C. for 24 h, to obtain the scaling-resistant and yellowing-resistant composite reverse osmosis membrane.

Example 5

The preparation process of the PEGMA particles and the primary composite reverse osmosis membrane is the same as that in Example 1.

MEDSAH and IBMA are added into tetrahydrofuran to mix evenly, then AIBN as the initiator is added to obtain the solution. The mass ratio of MEDSAH, IBMA and AIBN is 4:3:0.005. The primary composite reverse osmosis membrane is put in the solution for ultrasonic reaction at 25° C. for 24 h, to obtain the scaling-resistant and yellowing-resistant composite reverse osmosis membrane.

Comparative Example 1

The commercial polysulfone supported membrane is immersed in pure water in advance for cleaning, and the excess water is removed via the rubber roller. Then, the commercial polysulfone supported membrane is put in the aqueous phase solution composed of 2.5% m-phenylenediamine and 0.15% triethylamine for 15 s, and then put in the oil phase solution composed of the n-hexane solution containing 0.08% trimesoyl chloride for 30 s. Then, the heat treatment is carried out at 80° C. for 10 min to obtain the primary composite reverse osmosis membrane.

Comparative Example 2

The commercial polysulfone supported membrane is immersed in pure water in advance for cleaning, and the excess water is removed via the rubber roller. Then, the commercial polysulfone supported membrane is put in the aqueous phase solution composed of 2.5% m-phenylenediamine and 0.15% triethylamine for 15 s, and then put in the oil phase solution composed of the n-hexane solution containing 0.08% trimesoyl chloride for 30 s. Then, the heat treatment is carried out at 80° C. for 10 min to obtain the primary composite reverse osmosis membrane.

MEDSAH and IBMA are added into tetrahydrofuran to mix evenly, then AIBN as the initiator is added to obtain the solution. The mass ratio of MEDSAH, IBMA and AIBN is 1:2:0.003. The primary composite reverse osmosis membrane is put in the solution for ultrasonic reaction at 25° C. for 24 h, to obtain the composite reverse osmosis membrane.

The membrane performance test of the examples and comparative examples is performed at 25° C. with the pH value of 7-8 and the pressure of 1.55 MPa, and using the NaCl aqueous solution with the concentration of 2000 ppm. And the scaling resistance is tested by contact angle.

TABLE 1

Flux, salt rejection and scaling resistance of the examples and comparative examples

| Serial No. | Water flux ($L/m^2 \cdot h$ at initial state) | Salt rejection (% at initial state) | Water flux ($L/m^2 \cdot h$ at 180 day) | Salt rejection (% at 180 day) | Contact angle of membrane surface (° at 0 day) | Contact angle of membrane surface (° at 180 day) |
| --- | --- | --- | --- | --- | --- | --- |
| Comparative Example 1 | 33.7 | 97.8 | 25.8 | 96.3 | 56.4 | 88.2 |
| Comparative Example 2 | 40.8 | 97.6 | 33.6 | 96.1 | 53.1 | 79.6 |
| Example 1 | 52.1 | 98.9 | 51.3 | 98.6 | 35.7 | 36.8 |
| Example 2 | 49.8 | 99.2 | 49.0 | 99.0 | 34.4 | 34.6 |
| Example 3 | 57.3 | 99.1 | 56.8 | 98.9 | 37.3 | 38.7 |
| Example 4 | 55.2 | 98.7 | 54.9 | 98.5 | 40.1 | 42.5 |
| Example 5 | 56.3 | 99.6 | 56.0 | 99.3 | 38.5 | 39.2 |

It can be seen from Table 1 that the scaling-resistant and yellowing-resistant composite reverse osmosis membrane prepared by the method of the present disclosure has high flux, hydrophilic property, excellent scaling-resistant and yellowing-resistant properties. The performance and stability of the membrane are greatly improved by the three-network high-performance PMEDSAH/PEGMA/PIBMA composite coating.

It shall be pointed out that the above examples are only the preferred examples of the present disclosure, not intended to limit the present disclosure. Various modifications and improvements made within the concept and principle of the present disclosure shall fall within the protection scope of the present disclosure.

What is claimed is:

1. A preparation method of a scaling-resistant and yellowing-resistant composite reverse osmosis membrane, wherein, comprising following steps:
   (1) dissolving ethylene glycol methacrylate (EGMA) in anisole, and ultrasonically stirring to mix evenly; then sequentially adding a first initiator and 2-dodecylsulfanylthiocarbonylsulfanyl-2-methyl propionic acid (DMP) as a chain transfer agent, sealing and vacuum mixing at 25° C. for 5 h to obtain a product; precipitating the product into a large amount of petroleum ether, then separating the product by filtration, and then vacuum drying the product at 40° C. for 24 h to obtain poly(ethylene glycol) methacrylate (PEGMA) particles;
   (2) immersing a polysulfone supported membrane in pure water in advance for cleaning, and removing excess water via a rubber roller, then putting the polysulfone supported membrane in an aqueous phase solution for 15 seconds-60 seconds and in an oil phase solution for 15 seconds-60 seconds, and performing heat treatment for the polysulfone supported membrane to obtain a primary composite reverse osmosis membrane; and
   (3) adding 2-(methacryloyloxy)ethyl)dimethyl-3-sulphoproyl) ammonium hydroxide (MEDSAH) and N-(isobutoxymethyl) acrylamide (IBMA) to tetrahydrofuran to mix evenly, and then adding azobisisobutyronitrile (AIBN) as a second initiator to obtain a solution; putting the primary composite reverse osmosis membrane prepared in the step (2) in the solution for ultrasonic reaction at 25° C. for 24 h, to obtain the scaling-resistant and yellowing-resistant composite reverse osmosis membrane.

2. The preparation method according to claim 1, wherein, in the step (1), a mass ratio of the EGMA, the first initiator and the DMP as the chain transfer agent is: (1-3):(0.005-0.008):(0.002-0.004).

3. The preparation method according to claim 1, wherein, in the step (1), the first initiator is a mixture of the AIBN and benzoyl peroxide (BPO) at a mass ratio of 1:1.

4. The preparation method according to claim 1, wherein, in the step (2), the aqueous phase solution is composed of following components in mass percentage: the PEGMA particles 0-1%, a monomer 2.5%, and triethylamine 0.2%.

5. The preparation method according to claim 4, wherein, in the step (2), the monomer in the aqueous phase solution is one of p-phenylenediamine, m-phenylenediamine and o-phenylenediamine.

6. The preparation method according to claim 1, wherein, in the step (2), the oil phase solution is composed of following components in mass percentage: 0.08% trimesoyl chloride, and a balance of a n-hexane solution.

7. The preparation method according to claim 1, wherein, in the step (2), the heat treatment is carried out at 80° C. for 10 min.

8. The preparation method according to claim 1, wherein, in the step (3), a mass ratio of the MEDSAH, the IBMA and the AIBN is: (1-4):(1-3):(0.003-0.005).

* * * * *